C. Folsom,
Ash Sieve.
No 78,949. Patented June 16, 1868.

Witnesses:
W. C. Ashkettle
Wm A Morgan

Inventor:
Chas. Folsom
per Munn & Co
Attorneys

United States Patent Office.

CHARLES FOLSOM, OF NEW YORK, N. Y.

Letters Patent No. 78,949, dated June 16, 1868.

---

IMPROVEMENT IN ASH-SIFTERS.

---

The Schedule referred to in these Letters Patent and making part of the same.

---

TO ALL WHOM IT MAY CONCERN:

Be it known that I, CHARLES FOLSOM, of the city, county, and State of New York, have invented a new and improved Ash-Sifter, &c.; and I do hereby declare that the following is a full, clear, and exact description thereof, which will enable others skilled in the art to make and use the same, reference being had to the accompanying drawing forming a part of this specification.

The present invention relates to a new and useful device by which ashes or other substances may be both transferred to the sifting-apparatus, and sifted without the escape of dust; the construction and operation of which will be understood from the following description, reference being had to the accompanying drawing, in which—

Figure 1:
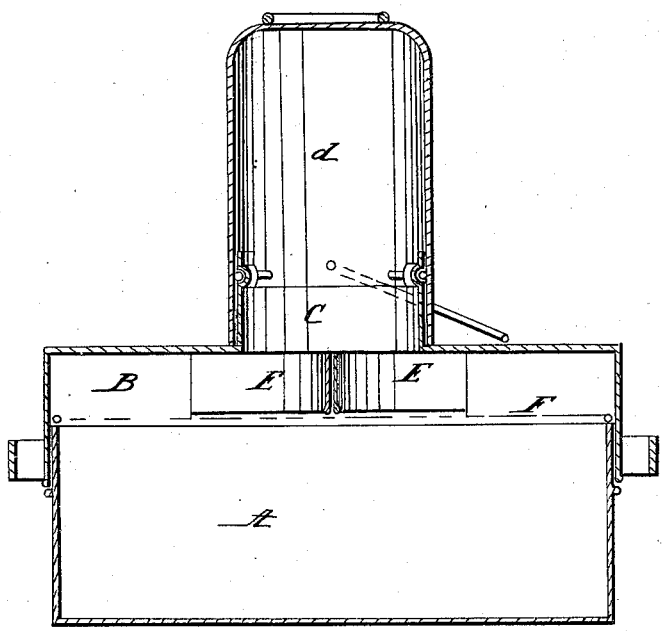
Figure 2:
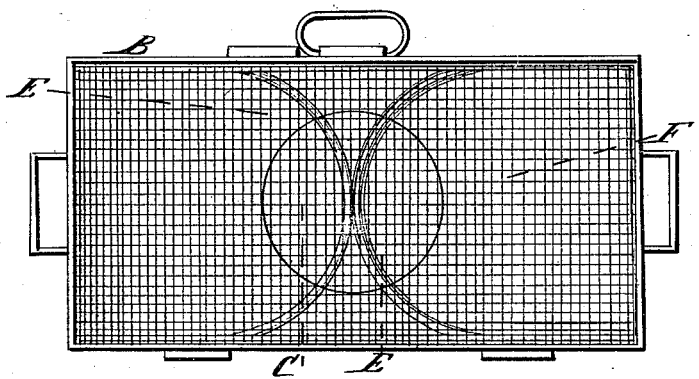

Figure 1 represents a sectional elevation, and
Figure 2 is a plan of the sifter.

Similar letters of reference indicate corresponding parts.

The letter A represents a vessel, (which, if desired, may be an ordinary ash-pan,) of suitable size and shape to fit under and receive directly from a grate or "dump" the substance to be sifted, and over the top of which the mouth of the sifting-apparatus, B, is closely fitted, and may be easily attached or detached, either with or without a suitable hinge.

The part B has an opening, C, of any desired shape or size, (in its top, as represented in the drawing,) with a flange projecting outward, which will exactly fit the mouth of the pail or vessel d.

To operate this sifter, dump the contents of the grate or "dump" directly into the pan A, withdraw the same from under the grate, and adjust over its mouth (with or without hinging) the sifting-apparatus B, on the top of which is placed the pail or vessel d, as shown in fig. 1 in the drawing. Then turn the whole apparatus upside down and rock the pan to and fro, the bottom of the bucket or vessel being rounded for that purpose, the ashes or fine stuff will be shaken through the sieve F, and, assisted by the partitions E E, will at once fall into the pail or vessel below, which may be taken off, with its useless contents, without making the slightest dust, leaving the remainder of the contents of the pan A in that vessel perfectly free from dust or ashes.

I do not limit myself to using this apparatus exclusively as an ash-sifter, but propose using the same for the sifting and sorting other ingredients and substances.

Having thus described my invention, what I claim as new, and desire to secure by Letters Patent, is—

1. The sifting-box B, having a wire-gauze bottom, F, semicircular flanges E, and flanged opening C, over which the pail d is fitted, said box B being adapted to fit over the box A, as herein shown and described.

2. The combination and arrangement of the sifting-box B, having open bottom F, flanges E, and flanged opening C, the pail d, provided with a rounded bottom, and the pan A, all constructed to operate in the manner and for the purpose herein shown and described.

CHAS. FOLSOM.

Witnesses:
 WM. F. MCNAMARA,
 CHARLES H. NASH.